(12) United States Patent
Wieber et al.

(10) Patent No.: US 6,923,499 B2
(45) Date of Patent: Aug. 2, 2005

(54) MULTIPLE MATERIAL ASSEMBLY FOR NOISE REDUCTION

(75) Inventors: Robert Wieber, Lapeer, MI (US); Jon Riley, Farmington, MI (US)

(73) Assignee: L & L Products, Romeo, MI (US)

( * ) Notice: Subject to any disclaimer, the term of this patent is extended or adjusted under 35 U.S.C. 154(b) by 0 days.

(21) Appl. No.: 10/628,973

(22) Filed: Jul. 28, 2003

(65) Prior Publication Data

US 2004/0075299 A1 Apr. 22, 2004

Related U.S. Application Data

(60) Provisional application No. 60/401,616, filed on Aug. 6, 2002.

(51) Int. Cl.$^7$ .................................................. B60J 7/00
(52) U.S. Cl. .................. 296/211; 296/187.02; 296/39.3
(58) Field of Search ......................... 296/181.6, 187.02, 296/39.3, 211, 93.3

(56) References Cited

U.S. PATENT DOCUMENTS

| | | |
|---|---|---|
| 4,378,395 A | 3/1983 | Asoshina et al. |
| 4,451,518 A | 5/1984 | Miura et al. |
| 4,463,870 A | 8/1984 | Coburn, Jr. et al. |
| 4,476,183 A | 10/1984 | Holtrop et al. |
| 4,598,008 A | 7/1986 | Vogt et al. |
| 4,610,836 A | 9/1986 | Wycech |
| 4,751,249 A | 6/1988 | Wycech |
| 4,769,391 A | 9/1988 | Wycech |
| 4,813,690 A | 3/1989 | Coburn, Jr. |
| 4,836,516 A | 6/1989 | Wycech |
| 4,853,270 A | 8/1989 | Wycech |
| 4,861,097 A | 8/1989 | Wycech |
| 4,867,271 A | 9/1989 | Tschudin-Mahrer |
| 4,922,596 A | 5/1990 | Wycech |
| 4,923,902 A | 5/1990 | Wycech |
| 4,978,562 A | 12/1990 | Wycech |
| 5,102,188 A | 4/1992 | Yamane |
| 5,124,186 A | 6/1992 | Wycech |
| 5,266,133 A | 11/1993 | Hanley et al. |
| 5,358,397 A | 10/1994 | Ligon et al. |

(Continued)

FOREIGN PATENT DOCUMENTS

| | | |
|---|---|---|
| DE | 42 27 393 A1 | 3/1993 |
| DE | 198 12 288 C1 | 5/1999 |
| DE | 198 56 255 C1 | 1/2000 |
| DE | 198 58 903 A1 | 6/2000 |
| EP | 0 061 131 | 9/1982 |
| EP | 0 588 182 A2 | 3/1994 |
| EP | 0 611 778 B1 | 8/1994 |
| EP | 0 891 918 A1 | 1/1999 |
| EP | 0 893 331 A1 | 1/1999 |
| EP | 0 893 332 A1 | 1/1999 |
| EP | 1 122 156 A2 | 8/2001 |
| EP | 0 893 332 B1 | 3/2002 |
| EP | 1 362 683 A2 | 11/2003 |
| EP | 1 362 769 A1 | 11/2003 |
| EP | 1 428 744 | 6/2004 |

(Continued)

OTHER PUBLICATIONS

Copending U.S. Appl. No. 09/631,211 filed Aug. 3, 2000.
Copending U.S. Appl. No. 10/404,831 filed Apr. 1, 2003.

(Continued)

*Primary Examiner*—Jason Morrow
(74) *Attorney, Agent, or Firm*—Dobrusin & Thennisch PC

(57) ABSTRACT

An assembly having one or more members (e.g., panels), a first expandable material and a second expandable material is disclosed. One of the materials is typically more expandable than the other. Although, the assembly may be used for various articles, it has been found particularly suitable for roofs of automotive vehicles.

24 Claims, 1 Drawing Sheet

U.S. PATENT DOCUMENTS

| | | | |
|---|---|---|---|
| 5,506,025 A | 4/1996 | Otto et al. |
| 5,575,526 A | 11/1996 | Wycech |
| 5,725,272 A | 3/1998 | Jones |
| 5,755,486 A | 5/1998 | Wycech |
| 5,766,719 A | 6/1998 | Rimkus |
| 5,806,919 A | 9/1998 | Davies |
| 5,851,626 A | 12/1998 | McCorry et al. |
| 5,858,521 A | 1/1999 | Okuda et al. |
| 5,884,960 A | 3/1999 | Wycech |
| 5,888,600 A | 3/1999 | Wycech |
| 5,892,187 A | 4/1999 | Patrick |
| 5,902,656 A | 5/1999 | Hwang |
| 5,931,474 A | 8/1999 | Chang et al. |
| 5,932,680 A | 8/1999 | Heider |
| 5,985,435 A | 11/1999 | Czaplicki et al. |
| 5,992,923 A | 11/1999 | Wycech |
| 5,997,077 A | 12/1999 | Siebels et al. |
| 6,003,274 A | 12/1999 | Wycech |
| 6,006,484 A | 12/1999 | Geissbuhler |
| 6,033,300 A | 3/2000 | Schneider |
| 6,050,630 A | 4/2000 | Hochet |
| 6,068,424 A | 5/2000 | Wycech |
| 6,073,991 A | 6/2000 | Naert |
| 6,079,180 A | 6/2000 | Wycech |
| 6,092,864 A | 7/2000 | Wycech et al. |
| 6,096,403 A | 8/2000 | Wycech et al. |
| 6,099,948 A | 8/2000 | Paver, Jr. |
| 6,103,341 A | 8/2000 | Barz et al. |
| 6,131,897 A | 10/2000 | Barz et al. |
| 6,149,227 A | 11/2000 | Wycech |
| 6,150,428 A | 11/2000 | Hanley, IV et al. |
| 6,165,588 A | 12/2000 | Wycech |
| 6,168,226 B1 | 1/2001 | Wycech |
| 6,189,953 B1 | 2/2001 | Wycech |
| 6,196,621 B1 | 3/2001 | VanAssche |
| 6,199,940 B1 | 3/2001 | Hopton et al. |
| 6,207,244 B1 | 3/2001 | Hesch |
| 6,228,478 B1 | 5/2001 | Kliwer et al. |
| 6,233,826 B1 | 5/2001 | Wycech |
| 6,237,304 B1 | 5/2001 | Wycech |
| 6,244,601 B1 | 6/2001 | Buchholz et al. |
| 6,253,524 B1 | 7/2001 | Hopton et al. |
| 6,263,635 B1 | 7/2001 | Czaplicki |
| 6,270,600 B1 | 8/2001 | Wycech |
| 6,272,809 B1 | 8/2001 | Wycech |
| 6,276,105 B1 | 8/2001 | Wycech |
| 6,281,260 B1 | 8/2001 | Hanley, IV et al. |
| 6,287,666 B1 | 9/2001 | Wycech |
| 6,296,298 B1 | 10/2001 | Barz |
| 6,305,136 B1 | 10/2001 | Hopton et al. |
| 6,311,452 B1 | 11/2001 | Barz et al. |
| 6,315,938 B1 | 11/2001 | Jandali |
| 6,319,964 B1 | 11/2001 | Blank et al. |
| 6,321,793 B1 | 11/2001 | Czaplicki et al. |
| 6,332,731 B1 | 12/2001 | Wycech |
| 6,341,467 B1 | 1/2002 | Wycech |
| 6,358,584 B1 | 3/2002 | Czaplicki |
| 6,368,438 B1 | 4/2002 | Chang et al. |
| 6,372,334 B1 | 4/2002 | Wycech |
| D457,120 S | 5/2002 | Broccardo et al. |
| 6,382,635 B1 | 5/2002 | Fitzgerald |
| 6,383,610 B1 | 5/2002 | Barz et al. |
| 6,389,775 B1 | 5/2002 | Steiner et al. |
| 6,406,078 B1 | 6/2002 | Wycech |
| 6,413,611 B1 | 7/2002 | Roberts et al. |
| 6,419,305 B1 | 7/2002 | Larsen |
| 6,422,575 B1 | 7/2002 | Czaplicki et al. |
| H2047 H | 9/2002 | Harrison et al. |
| 6,454,974 B1 | 9/2002 | Wilson |
| 6,455,146 B1 | 9/2002 | Fitzgerald |
| 6,467,834 B1 | 10/2002 | Barz et al. |
| 6,471,285 B1 | 10/2002 | Czaplicki et al. |
| 6,474,722 B2 | 11/2002 | Barz |
| 6,474,723 B2 | 11/2002 | Czaplicki et al. |
| 6,475,577 B1 | 11/2002 | Hopton et al. |
| 6,482,486 B1 | 11/2002 | Czaplicki et al. |
| 6,482,496 B1 | 11/2002 | Wycech |
| 6,491,336 B1 | 12/2002 | Beckmann et al. |
| 6,502,821 B2 | 1/2003 | Schneider |
| 6,519,854 B2 | 2/2003 | Blank |
| 6,523,857 B1 | 2/2003 | Hopton et al. |
| 6,523,884 B2 | 2/2003 | Czaplicki et al. |
| 6,546,693 B2 | 4/2003 | Wycech |
| 6,561,571 B1 | 5/2003 | Brennecke |
| 6,573,309 B1 | 6/2003 | Reitenbach et al. |
| 6,575,526 B2 | 6/2003 | Czaplicki et al. |
| 6,607,238 B2 | 8/2003 | Barz |
| 6,607,831 B2 | 8/2003 | Ho et al. |
| 6,619,727 B1 | 9/2003 | Barz et al. |
| 6,634,698 B2 | 10/2003 | Kleino |
| 6,641,208 B2 | 11/2003 | Czaplicki et al. |
| 6,668,457 B1 | 12/2003 | Czaplicki |
| 6,692,347 B1 | 2/2004 | Schneider |
| 6,729,425 B2 | 5/2004 | Schneider |
| 6,748,667 B2 | 6/2004 | Sevastian |
| 6,777,049 B2 | 8/2004 | Sheldon et al. |
| 6,786,533 B2 | 9/2004 | Bock et al. |
| 6,793,274 B2 | 9/2004 | Riley et al. |
| 6,811,864 B2 | 11/2004 | Czaplicki et al. |
| 6,820,923 B1 | 11/2004 | Bock |
| 2001/0020794 A1 | 9/2001 | Ishikawa |
| 2002/0053179 A1 | 5/2002 | Wycech |
| 2002/0074827 A1 | 6/2002 | Fitzgerald et al. |
| 2002/0160130 A1 | 10/2002 | Sheldon et al. |
| 2002/0174954 A1 | 11/2002 | Busseuil et al. |
| 2003/0001469 A1 | 1/2003 | Hankins et al. |
| 2003/0039792 A1 | 2/2003 | Hable et al. |
| 2003/0042056 A1 | 3/2003 | Schneider et al. |
| 2003/0050352 A1 | 3/2003 | Guenther et al. |
| 2003/0057737 A1 | 3/2003 | Bock et al. |
| 2003/0062739 A1 | 4/2003 | Bock |
| 2003/0069335 A1 | 4/2003 | Czaplicki et al. |
| 2003/0090129 A1 | 5/2003 | Riley et al. |
| 2003/0140671 A1 | 7/2003 | Lande et al. |
| 2003/0144409 A1 | 7/2003 | Kassa et al. |
| 2003/0176128 A1 | 9/2003 | Czaplicki et al. |
| 2003/0183317 A1 | 10/2003 | Czaplicki et al. |
| 2003/0184121 A1 | 10/2003 | Czaplicki et al. |
| 2003/0186049 A1 | 10/2003 | Czaplicki et al. |
| 2003/0201572 A1 | 10/2003 | Coon et al. |
| 2003/0218019 A1 | 11/2003 | Le Gall et al. |
| 2004/0011282 A1 | 1/2004 | Myers et al. |
| 2004/0074150 A1 | 4/2004 | Wycech |
| 2004/0079478 A1 | 4/2004 | Merz |
| 2004/0135058 A1 | 7/2004 | Wycech |

FOREIGN PATENT DOCUMENTS

| | | |
|---|---|---|
| FR | 2 749 263 | 5/1997 |
| GB | 2 061 196 A | 5/1981 |
| GB | 2 375 328 A | 11/2002 |
| GB | 2 401 349 A | 11/2004 |
| WO | WO 95/32110 | 11/1995 |
| WO | WO 97/02967 | 1/1997 |
| WO | WO 97/43501 | 11/1997 |
| WO | WO 98/36944 | 8/1998 |
| WO | WO 98/50221 | 11/1998 |
| WO | WO 99/08854 | 2/1999 |
| WO | WO 99/28575 | 6/1999 |
| WO | WO 99/48746 | 9/1999 |
| WO | WO 99/50057 | 10/1999 |
| WO | WO 00/13958 | 3/2000 |

| | | |
|---|---|---|
| WO | WO 00/27920 | 5/2000 |
| WO | WO 00/37230 | 6/2000 |
| WO | WO 00/37302 | 6/2000 |
| WO | WO 00/40815 | 7/2000 |
| WO | WO 00/43254 | 7/2000 |
| WO | WO 00/46461 | 8/2000 |
| WO | WO 00/55444 | 9/2000 |
| WO | WO 01/10682 A1 | 2/2001 |
| WO | WO 01/54936 A1 | 8/2001 |
| WO | WO 01/71225 A1 | 9/2001 |
| WO | WO 01/83206 A1 | 11/2001 |
| WO | WO 01/88033 | 11/2001 |
| WO | WO 03/042024 A1 | 5/2003 |
| WO | WO 03/051676 | 6/2003 |
| WO | WO 03/089221 A1 | 10/2003 |
| WO | WO 2004/078451 A1 | 9/2004 |

OTHER PUBLICATIONS

Copending U.S. Appl. No. 10/617,058 filed Jul. 10, 2003.
Copending U.S. Appl. No. 10/621,209 filed Jul. 16, 2003.
Copending U.S. Appl. No. 10/606,602 filed Jun. 26, 2003.
Copending U.S. Appl. No. 10/464,251 filed Jun. 18, 2003.
International Search Report for Application Serial No. PCT/US03/24521 dated Dec. 22, 2003.
Born, Peter and Bernd Mayer, "Structural Bonding in Automotive Applications", AutoTechnology, Apr. 2004, pp. 44–47.

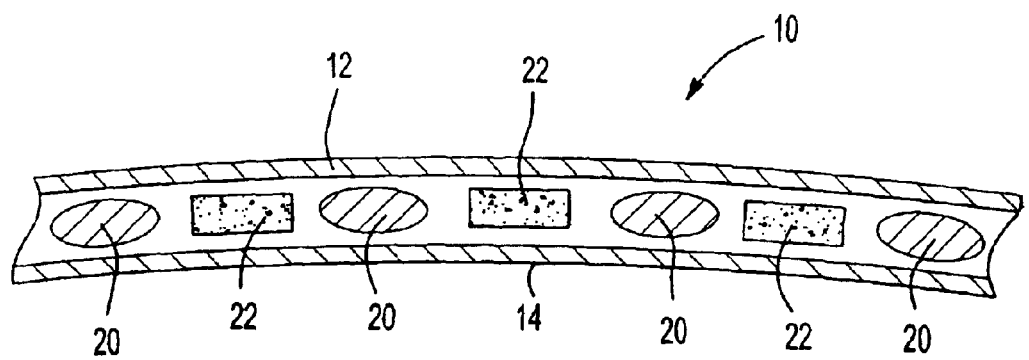
_Fig-1_
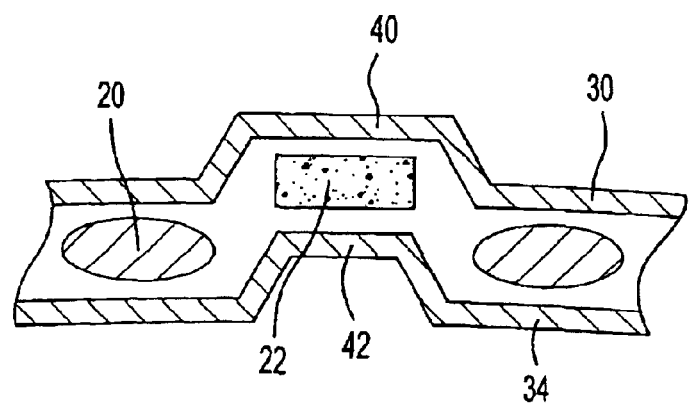
_Fig-2_
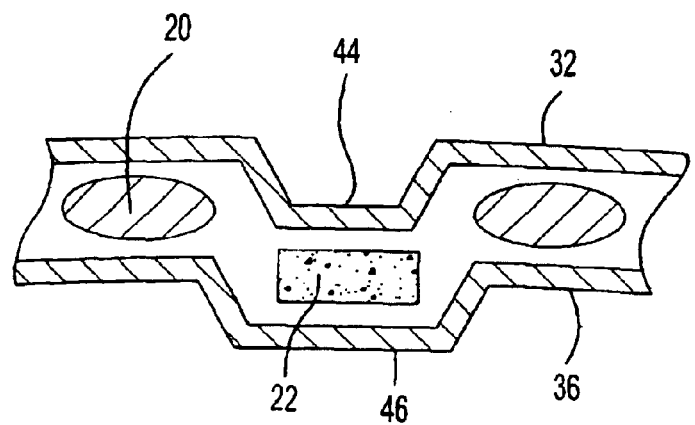
_Fig-3_

MULTIPLE MATERIAL ASSEMBLY FOR NOISE REDUCTION

CLAIM OF BENEFIT OF FILING DATE

The present application claims the benefit of the filing date of U.S. Provisional Application Ser. No. 60/401,616 (filed Aug. 6, 2002), hereby incorporated by reference.

FIELD OF THE INVENTION

The present invention relates generally to an assembly having at least two different materials for reducing noise of an article of manufacture. More particularly, the present invention relates to a roof assembly of an automotive vehicle having at least two different materials disposed between a roof panel and a roof bow of the assembly.

BACKGROUND OF THE INVENTION

For many years, the transportation industry has been concerned with reducing the amount of sound or noise (referred to herein simply as noise) emitted by automotive vehicles or other transport vehicles during operation thereof. Such concern is particularly acute for noise, which may be audible to persons within the vehicles. As an example, vibration of automotive vehicles may cause undesirable structure-borne or airborne noise. Thus, the present invention seeks to provide an assembly that has improved ability to attenuate, dampen and/or absorb vibration and/or noise.

SUMMARY OF THE INVENTION

The present invention is predicated upon an assembly that positions at least two different expandable materials upon one or more members for providing noise reduction. Preferably, the one or more members are opposing panels of a roof assembly of an automotive vehicle although not required. It is also preferable that at least one of the expandable materials be more expandable (i.e., have a greater volumetric expansion relative to its initial size) than another of the materials and/or that one of the materials is different from the other with regard to one of the following properties: density, volumetric expansion, flow, density, compressive modulus, tensile modulus, shear strength, a combination thereof or the like. Preferably, the properties of each material are selected based upon the frequencies of the noise to be attenuated.

Generally speaking, the assembly may utilize technology and processes such as those disclosed in U.S. Pat. Nos. 4,922,596, 4,978,562, 5,124,186, and 5,884,960 and commonly owned, co-pending U.S. application Ser. No. 09/502, 686 filed Feb. 11, 2000 and 09/524,961 filed Mar. 14, 2000, all of which are expressly incorporated herein by reference. The invention may also employ extrusion techniques commonly known in the art as well as a mini-applicator technique as in accordance with the teachings of commonly owned U.S. Pat. No. 5,358,397 ("Apparatus For Extruding Flowable Materials"), hereby expressly incorporated herein by reference. In a non-limiting embodiment, the noise reducing materials or mediums of the invention include or are at least partially coated with an active polymer having damping characteristics or other heat activated polymers, (e.g., a formable hot melt adhesive based polymer or an expandable structural foam, examples of which include olefinic polymers, vinyl polymers, thermoplastic rubber-containing polymers, epoxies, urethanes or the like). The materials are preferably foamable or expandable and can be snap-fit onto the chosen surface or substrate; placed into beads or pellets for placement along the chosen substrate or member by means of extrusion; placed along the substrate through the use of baffle technology; die-cast according to teachings that are well known in the art; pumped via systems which could include the use of a baffle and bladder system, injection molded, insert molded, compression molded or sprayed.

BRIEF DESCRIPTION OF THE DRAWINGS

The features and inventive aspects of the present invention will become more apparent upon reading the following detailed description, claims, and drawings, of which the following is a brief description:

FIG. 1 illustrates a sectional view of an exemplary roof assembly of an automotive vehicle formed in accordance with an aspect of the present invention.

FIG. 2 illustrates a sectional view of a portion of another exemplary roof assembly of an automotive vehicle formed in accordance with an aspect of the present invention.

FIG. 3 illustrates a sectional view of another portion of another exemplary roof assembly of an automotive vehicle formed in accordance with an aspect of the present invention.

DETAILED DESCRIPTION OF THE PREFERRED EMBODIMENT

The present invention is predicated upon providing an assembly of an article of manufacture that includes at least two different materials for reducing noise or vibration (e.g. structure-borne vibration of the article and subsequent airborne vibration or noise) emitted by the article. As used herein, the term noise is meant to refer to any sound whatsoever unless otherwise specified. The assembly of the present invention has found particular utility as an assembly of an automotive vehicle and more particularly as a roof assembly of an automotive vehicle. It is contemplated, however, that the assembly may be employed in a variety of articles of manufacture such as airplanes, boats, buildings, furniture or the like.

Accordingly, the assembly of the present invention typically includes one or more of the following:

1) a first member (e.g., an automotive vehicle outer roof panel);
2) a second member (e.g., an automotive vehicle roof bow panel) that is preferably positioned to oppose the first member;
3) a first expandable material configured to expand a first volumetric amount relative to an original size of the first expandable material; and
4) a second expandable material configured to expand a second volumetric amount relative to an original size of the second expandable material, the second amount being less than the first amount.

Referring to FIG. 1, there is illustrated one exemplary preferred embodiment of an assembly 10 formed in accordance with the present invention. In the particular embodiment illustrated, the assembly 10 is shown as a roof or roof assembly of an automotive vehicle. However, the assembly 10 should not be limited to a roof assembly unless specifically stated.

The roof assembly 10 includes a first member shown as an outer roof panel 12 of an automotive vehicle and a second member shown as a roof bow panel 14 of the vehicle. In the embodiment illustrated, the outer roof panel 12 is generally opposing and substantially parallel to the roof bow panel 14 although it is contemplated that various other arrangements may be employed.

In the exemplary embodiment of FIG. 1, the outer roof panel 12 and the roof bow panel 14 are both oriented substantially horizontally and are generally arcuate as they span the roof assembly 10 of the vehicle. One or more masses of a first expandable material and one or more masses of a second expandable material are located between the outer roof panel 12 and the roof bow panel 14. Preferably, the first material is selected based upon its ability to attenuate a first range of frequencies and the second material is selected based upon its ability to attenuate a second range of frequencies different than the first range. Generally, the first and second range of frequencies may be overlappling or non-overlapping relative to each other. In a particularly preferred embodiment, the first material is an acoustic material and the second material is a structural material.

It is contemplated that the masses of the first and second material may be arranged in a variety of shapes and configurations between the panels 12, 14. In the embodiment shown, the both the masses of the first material and the masses of second material are respectively formed as elongated strips 20, 22. It is contemplated that the strips 20, 22 may extend substantially longitudinally, laterally or combinations thereof relative to the roof assembly 10, the panels 12, 14, the vehicle or a combination thereof.

The strips 20, 22 may be arranged as needed or desired between the panels 12, 14 depending upon the size, design or shape of the assembly 10 and/or depending upon the frequencies of sound to be attenuated by the materials. There may be more strips 20 of the first material relative to the strips 22 of the second material. Moreover, it is contemplated that only one of each strip 20, 22 is provided. In the preferred embodiment, the strips 20 of the first material and the strips 22 of the second material are arranged intermittently with respect to each other (e.g., each strip 20 of the first material is located between two strips 22 of the second material). In one preferred embodiment, the strips 20, 22 are arranged in concentric circles.

The first and second materials are preferably heat activated expandable or foamable materials that are activated to expand and then cure to form a strong bond between adjacent surfaces. The materials may be generally dry to the touch or tacky and can be placed upon surfaces of members in any form of desired pattern, placement, or thickness, but are preferably applied with substantially uniform thickness. Exemplary expandable materials include L-2311, L-5204, L-5218, L5206, L5207, L5208, L5209, L5222, L-7100, L7102, L7101, L7220 foams and a family of materials acronymically known as HERF available through L&L Products, Inc. of Romeo, Mich.

Though other heat activated materials are possible for the first and second materials, preferred heat activated materials are expandable plastics, and are preferably foamable. Particularly preferred materials are epoxy-based foams which may be structural or acoustic. For example, without limitation, the foam may be an epoxy-based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules.

A number of epoxy-based structural and acoustic foams are known in the art and may also be used for the first or second material. A typical foam includes a polymeric base material, such as an epoxy resin or ethylene-based polymer which, when compounded with appropriate ingredients (typically a blowing and curing agent), expands and cures in a reliable and predicable manner upon the application of heat or the occurrence of a particular ambient condition. From a chemical standpoint for a thermally-activated material, the foam is usually initially processed as a flowable thermoplastic material before curing. It will cross-link upon curing, which makes the material substantially incapable of further flow. An example of a preferred foam formulations for the first and second materials are epoxy-based or otherwise-based materials that are commercially available from L&L Products of Romeo, Mich., under the designations L5206, L5207, L5208, L5209, L-5218, L-2105, L-2100, L-7005, L-2018, L-7101, L-7102, L-2411, L-2412, L4141, L-3050, L-3051 XP321 and XP721.

One advantage of the preferred materials over prior art materials is that the preferred materials can be processed in several ways. The first and second materials can be processed by injection molding, extrusion compression molding or with a mini-applicator. This enables the formation and creation of part designs that exceed the capability of most prior art materials. In one preferred embodiment, the foam (in its uncured state) is substantially dry or relatively free of tack to the touch.

In alternative embodiments, the first and second materials can be formed of other materials as well, provided that the material selected is heat-activated or otherwise activated by an ambient condition (e.g. moisture, pressure, time or the like) and cures in a predictable and reliable manner under appropriate conditions for the selected application. One such material is the epoxy based resin disclosed in U.S. Pat. No. 6,131,897, the teachings of which are incorporated herein by reference, filed with the United States Patent and Trademark Office on Mar. 8, 1999 by the assignee of this application. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. See also, U.S. Pat. Nos. 5,766,719; 5,755,486; 5,575,526; and 5,932,680, (incorporated by reference). In general, and particularly for the second material, the desired characteristics of the foam include relatively high stiffness, high strength, high glass transition temperature (typically greater than 70 degrees Celsius), and good corrosion resistance properties. In this manner, the material does not generally interfere with the materials systems employed by automobile manufacturers.

In applications where the first and second materials are heat activated, thermally expanding material, an important consideration involved with the selection and formulation of the material is the temperature at which a material reaction, expansion, activation, flow and possibly curing, will take place. For instance, in most applications, it is undesirable for the material to be reactive at room temperature or otherwise at the ambient temperature in a production line environment. More typically, the material becomes reactive at higher processing temperatures, such as those encountered in an automobile assembly plant, when the material is processed along with the automobile components at elevated temperatures or at higher applied energy levels, e.g., during painting preparation steps. While temperatures encountered in an automobile assembly operation may be in the range of about 148.89° C. to 204.44° C. (about 300° F. to 400° F.). If needed, blowing agent activators can be incorporated into the composition to cause expansion at different temperatures outside the above range.

Some other possible materials for use in the first and second materials include, but are not limited to, polyolefin materials, copolymers and terpolymers with at least one monomer type an alpha-olefin, phenol/formaldehyde materials, phenoxy materials, and polyurethane. See also, U.S. Pat. Nos. 5,266,133; 5,766,719; 5,755,486; 5,575,526; 5,932,680; and WO 00/27920 (PCT/US 99/24795) (all of which are expressly incorporated by reference). In general, the desired characteristics of the resulting material include good corrosion resistance properties. Moreover, the materials can preferably withstand the processing conditions typically encountered in the manufacture of a vehicle, such as the e-coat priming, cleaning and degreasing and other coating processes, as well as the painting operations encountered in final vehicle assembly.

In another embodiment, the materials may be provided in an encapsulated or partially encapsulated form, which may comprise a pellet, which includes an expandable foamable material, encapsulated or partially encapsulated in an adhesive shell. An example of one such system is disclosed in commonly owned, co-pending U.S. application Ser. No. 09/524,298 ("Expandable Pre-Formed Plug"), hereby incorporated by reference.

In addition, as discussed previously, preformed patterns may also be employed such as those made by extruding a sheet (having a flat or contoured surface) and then die cutting it according to a predetermined configuration in accordance with the chosen structure, panel or beam, and applying it thereto.

The skilled artisan will appreciate that the assembly may be employed in combination with or as a component of a conventional sound blocking baffle, or a vehicle structural reinforcement system, such as is disclosed in commonly owned co-pending U.S. application Ser. Nos. 09/524,961 or 09/502,686 (hereby incorporated by reference).

With respect to each other, the first material preferably differs from the second material in expandability, chemistry, physical properties or the like such that the materials are adept at absorbing, attenuating, damping or otherwise lessening their own particular types of noise or vibration (e.g., such that the first material absorbs, attenuates, damps or otherwise lessens structure-borne vibrations or noise and resulting airborne noise at a frequency range unique to and/or overlapping with the frequency range that the second material absorbs, attenuates, damps or otherwise lessens). As a first difference, the first material preferably expands more than the second material. In particular, the first material preferably expands a greater amount relative to its original size as compared to an amount of expansion experienced by the second material relative to its original size. In a preferred embodiment, the strips 20 of the first material expand volumetrically about 100% to about 3000% or greater, more preferably about 200% to about 1200% or greater, even more preferably about 300% to about 800% and still more preferably about 400% to about 600% relative to the pre-expanded size of the strips 20. In the preferred embodiment, the strips 22 of the second material expand volumetrically, about 0% to about 800%, more preferably about 5% to about 700%, even more preferably about 10% to about 400% and still more preferably about 15% to about 250% relative to the pre-expanded size of the strips 22. Preferably, the second material has a relatively high compressive strength while the first material may have a comparatively lower compressive strength.

It is contemplated that the differences between the first material and the second material in compressive strength, shear strength, compressive modulus, tensile strength, tensile modulus or other types of strength or moduli may be at least partially due to the relative post expansion densities of the materials. In one preferred embodiment the second material has a post expansion density of about 0.05 or lower to about 1.0 g/cm$^3$, more preferably about 0.16 to about 0.8 g/cm$^3$ and even more preferably about 0.25 g/cm$^3$ to about 0.60 g/cm$^3$. In another preferred embodiment the first material has a post expansion density of about 0.005 or to about 0.15 g/cm$^3$ or higher, more preferably about 0.01 to about 0.09 g/cm$^3$ and even more preferably about 0.03 g/cm$^3$ to about 0.07 g/cm$^3$.

Chemically, the first material may vary from the second material in a variety of ways. Generally, it is preferable that the first material be formulated with greater weight percentages of blowing agent and/or blowing agent accelerators relative to the second material. In one preferred embodiment, the first material has 10% greater weight percentage of blowing agent and/or blowing agent accelerator, more preferably 30% greater weight percentage of blowing agent and/or blowing agent accelerator and even more preferably 50% greater weight percentage of blowing agent and/or blowing agent accelerator. In another preferred embodiment, the first material has 10% less weight percentage of curing agent and/or curing agent accelerator, more preferably 30% less weight percentage of curing agent and/or curing agent accelerator and even more preferably 50% less weight percentage of curing agent and/or curing agent accelerator.

In one embodiment, the first material may be based upon an ethylene copolymer while the second material is based upon an one epoxy component material. In a preferred embodiment, the first material includes at least 20% by weight ethylene copolymer, more preferably at least 35% by weight ethylene copolymer and even more preferably at least 60% by weight ethylene copolymer. In another preferred embodiment, the second material includes at least 20% by weight one epoxy component material, more preferably at least 35% by weight one epoxy component material and even more preferably at least 60% by weight one epoxy component material.

For assembly, the masses of first and second material may be located between members according to a variety of techniques and may be applied before or after the members are assembled to each other. In the preferred embodiment, the strips 20, 22 of the first and second materials are preferably applied to one or more surface of either the outer roof panel 12, the roof bow panel 14 or a combination thereof with an extruder (e.g., a mini-extruder). Thereafter, the outer roof panel 12 is attached to the roof bow panel 14 in the opposing relation described above.

Once the first and second materials and the members or panels 12, 14 are positioned or arranged as desired, the first and second materials are activated to expand. Upon expansion, preferably both the first and second materials expand, contact and wet both members or panels 12, 14 followed by curing of the first and second materials to form first and second foam materials.

In the preferred embodiment illustrated, both the strips 20 of the first material and the strips 22 of the second material expand to bond to both the outer roof panel 12 and to the roof bow panel 14. Moreover, during operation of the vehicle, both the first and second materials assist in absorbing, attenuating, damping of otherwise lessening vibration or noise (e.g., structure-borne vibrations or noise and resulting airborne noise).

While it is contemplated that both materials may lessen some or all of the same types of noise, each of the materials is preferably configured, by way of their chemistries, their expandability, or otherwise, for lessening one or more particular noises that may be made by the panels 12, 14 or other components of the vehicle. For example, the first material has been found to dampen, attenuate, absorb or otherwise lessen noise caused by the outer roof panel 12 and the roof bow panel 14 vibrating together and/or contacting each other. As such, the first material has been found to dampen, attenuate, absorb or otherwise lessen noise in frequency ranges from about 600 Hz to about 2000 Hz or greater, more preferably from about 800 Hz to about 1800 Hz, even more preferably from about 1000 Hz to about 1600 Hz and most preferably from about 1200 Hz to about 1400 Hz. As another example, the second material has been found to dampen, attenuate, absorb or otherwise lessen noise caused by the flexural or other vibrations of outer roof panel sometimes referred to as roof boom. As such, the second material has be found to dampen, attenuate, absorb or otherwise lessen noise in frequency ranges from about 50 Hz or less to about 1200 Hz or less, more preferably from about 100 Hz to about 1000 Hz, even more preferably from about 150 Hz to about 700 Hz and most preferably from about 200 Hz to about 400 Hz.

Generally, it has been found that the second material has greater noise reduction if it bonds the outer roof panel 12 to the roof bow panel 14 at more central locations of roof assembly 10. Moreover, without being bound to any theory, it is believed that the second material reduces noise by structurally bonding the outer roof panel 12 to the roof bow panel 14 thereby increasing structural integrity and/or altering the harmonic frequencies of the panels 12, 14 and lessening movements such as vibration or movements of the panel caused by vibration (e.g., structure-borne vibration).

Prior to expansion of the first and second materials, particularly the second material, it may be advantageous to stiffen the outer roof panel 12 to prevent read through. Various stiffening techniques known in the art may be employed. As an alternative, however, the expandable materials may be positioned adjacent or between structural features of members to prevent read through or to make any read through less visible. Referring to FIGS. 2 and 3, there is illustrated outer roof panels 30, 32 and roof bow panels 34, 36 that respectively include corresponding elongated protrusions 40, 42, 44, 46 formed therein. In FIG. 2, the protrusions 40, 42 are outwardly protruding relative to the vehicle. In FIG. 3, the protrusions 44, 46 are inwardly protruding relative to the vehicle. Advantageously, the strips 20, 22 of either material, but particularly of the second material may be positioned between the protrusions 40, 42 or 44, 46 for hiding or preventing read through.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. An assembly for an automotive vehicle, the assembly comprising:
    a first member of the automotive vehicle;
    a second member of the automotive vehicle opposing the first member;
    a first expandable material disposed between the first member and the second member, the first expandable material configured for expanding a first amount upon exposure to a condition; and
    a second expandable material disposed between the first member and the second member, the second expandable material configured for expanding a second amount upon exposure to a condition, the first amount being greater than the second amount and the second amount being a volumetric expansion of about 5% to about 700%,
    wherein the first member or the second member is an outer panel of the automotive vehicle.

2. An assembly as in claim 1 wherein the first member is a panel and the second member is a panel.

3. An assembly as in claim 2 wherein at least a portion of the first member or the second member is configured as part of a roof of an automotive vehicle.

4. An assembly as in claim 2 wherein the first expandable material is configured as a strip and the second expandable material is configured as a strip, both strips extending longitudinally with the panels.

5. An assembly as in claim 4 wherein the first expandable material is configured as a plurality of strips and the second expandable material is also configured as a plurality of strips.

6. An assembly as in claim 4 wherein the strip of the first expandable material is an extruded strip.

7. An assembly as in claim 2 wherein the first expandable material has a post expansion density from about 0.005 g/cm$^3$ to about 0.15 g/cm$^3$ and the second expandable material has a post expansion density of about 0.16 g/cm$^3$ to about 0.8 g/cm$^3$.

8. An assembly as in claim 2 wherein the first expandable material has a weight percentage of curing agent that is at least 10% less than a weight percentage of curing agent for the second expandable material.

9. An assembly as in claim 2 wherein the second expandable material has a higher strength than the first expandable material upon expansion.

10. An assembly as in claim 4 wherein the strip of the second expandable material is positioned adjacent a structural feature of at least one of the first member and the second member.

11. An assembly as in claim 10 wherein the structural feature is a pair of protrusions and the strip of the second expandable material is positioned between the pair of protrusions.

12. A roof assembly for an automotive vehicle, the assembly comprising:
    a roof bow panel of the automotive vehicle;
    an outer roof panel of the automotive vehicle generally opposing and substantially parallel to the roof bow panel;
    a first expandable material disposed between the roof bow panel and the outer roof panel, wherein:
    i) the first expandable material is configured for expanding a first amount upon exposure to a condition, the first amount being a volumetric expansion of between about 300% to about 800%; and
    a second expandable material disposed between the roof bow panel and the outer roof panel, wherein;
    i) the second expandable material is configured for expanding a second amount upon exposure to a condition, the second amount being a volumetric expansion of between about 15% and about 250%; and
    ii) the first material includes a weight percentage of blowing agent that is at least 30% greater than a weight percentage of blowing agent in the second material.

13. An assembly as in claim 12 wherein the first expandable material is configured as a strip and the second expandable material is configured as a strip, both strips extending longitudinally with the roof bow panel and the outer roof panel.

14. An assembly as in claim 13 wherein the first expandable material is configured as a plurality of strips and the second expandable material is also configured as a plurality of strips.

15. An assembly as in claim 13 wherein the strip of the first expandable material is an extruded strip.

16. An assembly as in claim 12 wherein the first expandable material has a post expansion density from about 0.005 g/cm³ to about 0.15 g/cm³ and the second expandable material has a post expansion density of about 0.16 g/cm³ to about 0.8 g/cm³.

17. An assembly as in claim 12 wherein the first expandable material has a weight percentage of curing agent that is at least 10% less than a weight percentage of curing agent for the second expandable material.

18. An assembly as in claim 12 wherein the second expandable material has a higher strength than the first expandable material.

19. An assembly as in claim 14 wherein the strip of the second expandable material is positioned adjacent a structural feature of at least one of the first member and the second member and wherein the structural feature is a pair of protrusions and the strip of the second expandable material is positioned between the protrusions.

20. A roof assembly for an automotive vehicle, the assembly comprising:
   a roof bow panel;
   an outer roof panel generally opposing and substantially parallel to the roof bow panel;
   a first expandable material disposed between the roof bow panel and the outer roof panel, wherein:
   i) the first expandable material is configured for expanding a first amount upon exposure to a condition, the first amount being a volumetric expansion of between about 300% to about 800%; and
   ii) the first expandable material includes at least 35% by weight ethylene copolymer;
   a second expandable material disposed between the roof bow panel and the outer roof panel, wherein;
   i) the second expandable material is configured for expanding a second amount upon exposure to a condition, the second amount being a volumetric expansion of between about 15% and about 250%;
   ii) the first material includes a weight percentage of blowing agent that is at least 30% greater than a weight percentage of blowing agent in the second material; and
   iii) the second material includes at least 35% by weight of an epoxy material.

21. An assembly as in claim 20 wherein the first expandable material is configured as a strip and the second expandable material is configured as a strip, both strips extending longitudinally with the panels.

22. An assembly as in claim 21 wherein the first expandable material is configured as a plurality of strips and the second expandable material is also configured as a plurality of strips.

23. An assembly as in claim 21 wherein the strip of the second expandable material is positioned adjacent a structural feature of at least one of the first member and the second member and wherein the structural feature is a pair of protrusions and the strip of the second expandable material is positioned between the protrusions.

24. An assembly as in claim 1 wherein the first expandable material, once expanded, is configured to attenuate noise within a first frequency range and wherein the second expandable material, once expanded, is configured to attenuate noise within a second frequency range and wherein the first frequency range is from about 1000 Hz to about 1600 Hz and the second frequency range is from about 150 Hz to about 700 Hz.

* * * * *